COIN DISPOSAL APPARATUS FOR TELEPHONE PAYSTATION

Filed Oct. 1, 1964 3 Sheets-Sheet 1

INVENTOR
RICHARD J. HAMILTON
BY C. A. Gulbrandsen
ATTY.

COIN DISPOSAL APPARATUS FOR TELEPHONE PAYSTATION

Filed Oct. 1, 1964 3 Sheets-Sheet 2

INVENTOR
RICHARD J. HAMILTON

BY A. A. Gulbrandsen
ATTY.

COIN DISPOSAL APPARATUS FOR TELEPHONE PAYSTATION

Filed Oct. 1, 1964 3 Sheets-Sheet 3

INVENTOR
RICHARD J. HAMILTON
BY C. J. Gullbrandsen
ATTY.

3,307,779
Patented Mar. 7, 1967

3,307,779

COIN DISPOSAL APPARATUS FOR TELEPHONE PAYSTATION

Richard J. Hamilton, Lombard, Ill., assignor to Automatic Electric Laboratories, Inc., Northlake, Ill., a corporation of Delaware Filed Oct. 1, 1964, Ser. No. 400,802
3 Claims. (Cl. 232—57.5)

This invention relates in general to coin disposal apparatus, or mechanism, for use at a telephone pay station on a telephone circuit and more particularly to electromagnetic coin handling and switching apparatus therefor.

The type of telephone pay station to which the present invention is applicable is disclosed in general in U.S. Patent 1,043,219, issued Nov. 5, 1912, to O. F. Forsberg.

As disclosed and described in the Forsberg patent, in the usual operation of the telephone pay station coin disposal apparatus, a deposited coin by a calling pay station user operates certain mechanisms during its passage through the pay station to cause the operation of a switch, which completes a circuit to the central office to signal for service, or to seize automatic switching equipment for subsequently controlled operation to establish a desired communication connection. The deposited coin is temporarily held upon a coin trap, which is supported by a pivotable vane that is under control of an electromagnet. If the pivoted vane is moved by the electromagnet in one direction, the deposited coin is collected, while it is moved in the opposite direction, the coin is refunded, with the direction that this vane is moved, depending upon which direction the current is made to flow through the electromagnet.

While the present day coin disposal apparatus perform in a satisfactory manner, adjustment of the various springs, contacts and levers is critical and requires periodic inspection. The importance of this adjustment is emphasized by the fact that due to the increase in number of toll calls by pay-stations, the coin disposal apparatus is required to more frequently dispose of coin deposits of larger quantities and this must be done correctly and efficiently.

As applied to prepay telephone pay stations, the main object of my invention is to provide a simple, economical and improved coin disposal apparatus arranged for use with a prepay telephone pay station, which disposes of the coin deposit in an efficient and reliable and satisfactory manner.

In accordance with the above object, there is provided in a preferred embodiment of the invention, a simplified and improved telephone coin disposal mechanism comprising a single electromagnet having an armature assembly connected operatively to an actuating card and advance control link, constructed of an insulating type material, operated thereby. The actuating card, which is also constructed of an insulating material, is slidably mounted in such a manner that its direction of movement is parallel to the core of the electromagnet. The coin deflector vane is pivotably mounted in the coin chute by means of a shaft formed into its lower edge. The end of the deflector vane shaft pointing towards the electromagnet, extends through the wall of the coin chute and has the vane control link integrally mounted thereon. A permanent magnet is securely mounted to the inward end of the control link, with an extension from the upper end of the core of the electromagnet being positioned directly over the permanent magnet. The permanent magnet thus initially prepositions the deflector vane for either right or left operation, in accordance with the direction of the energizing current flow through the electromagnet, and the operation of the armature assembly by the electromagnet slides the actuating card downward to move the control link to the right or left, in accordance with the initial preposition of the deflector vane. Deposited coins are therefore collected or refunded, depending upon the direction of the current flow through the electromagnet, with current flow direction being controlled from the central office.

A modification of the preferred embodiment discloses a permanent magnet embedded in the upper edge of the vane control link and extending substantially along the full width. As previously mentioned, the vane control link of this embodiment also initially prepositions the deflector vane for either right or left operation, in accordance with the direction of the energizing current flow through the electromagnet, and the operation of the armature assembly by the electromagnet slides the actuating card downward to cause the vane control link to rotate in accordance with the prepositioned direction to move the deflector vane in the corresponding direction.

In accordance with the above paragraphs, a dominant feature of the invention relates to the provision of a permanent magnet for initially prepositioning the coin deflector vane for either right or left operation in accordance with the direction of energizing current flow through an electromagnet, whereby the proper disposition of the coin deposit is insured.

The coin collector disclosed in U.S. Patent 2,951,635, which issued Sept. 6, 1960, to A. P. Boysen, Jr., et al. shows an improvement over the Forsberg patent wherein a permanent magnet embedded in the selector card is magnetically controlled from a single electromagnet to tilt the selector card in a particular direction (depending upon the direction of the current flow through the electromagnet), and the operation of the armature of the electromagnet slides the selector card downward to operate a cam member, which is operatively connected to the coin deflector vane, for operating the vane to the desired position.

While the present invention represents an improvement over the Forsberg patent, it is also an improvement over the Boysen patent, in that the coin deflector vane is prepositioned under direct control of a permanent magnet to positively insure the operation of the deflector vane in the desired direction, thereby eliminating incorrect operation resulting from friction, wear and lost motion.

The novel features believed to be characteristic of the invention are set forth with particularity in the appended claims, while the invention both as to its organization and method of operation, together with further objects and advantages will be best understood by referring to the detailed operational description taken in conjunction with the accompanying drawings, in which:

A description of the structure of the invention will now be given, reference being had with the drawings and bearing in mind that the same reference numbers have been used on similar elements throughout.

Figure 1:
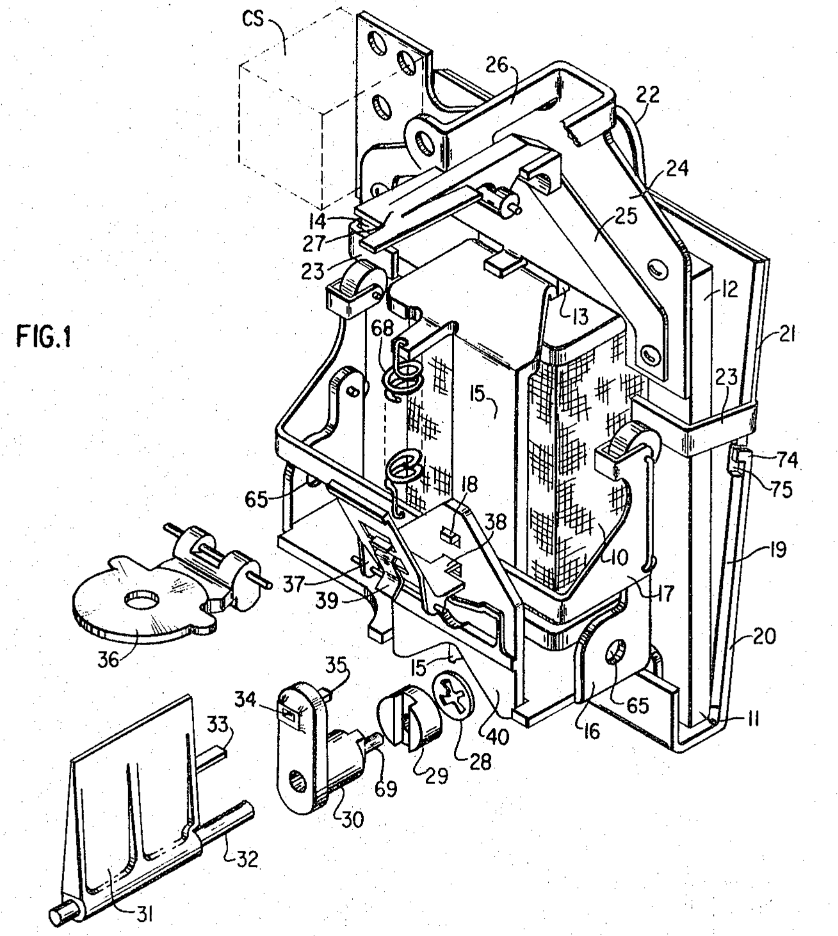
FIG. 1 shows the coin relay and its associated parts in perspective, with an exploded view of the coin disposal apparatus operated thereby.

Referring in particular to FIGS. 1 through 5, it will be appreciated that the coin disposal apparatus comprises a single electromagnetic coil 10 supported on an E-shaped core 11, with the coil positioned over the center leg 13 between the two outer legs 12 and 14.

A bracket 16 is secured to the lower edge of core 11 by means of screws 66 to provide a guide for actuating card 40; to provide means for the pivotable mounting of control yoke 17; and to provide means for securing coinc hute 45 by means of a lower pair of arms (not shown) to mounting holes 65. The screws 66 are also used to secure the armature holding and positioning spring 20 to core 11.

A U-shaped armature 19 is mounted on the outer surface of core legs 12 and 14 and is held in place by means of fingers 74 of positioning spring 20 engaging notches such as 75 in armature 19. A control plate 21 is securely attached to the outer upper surface of armature 19, with extension fingers 23 being provided for engaging and pivotally operating card control yoke 17 whenever armature 19 is operated as a result of the energization of coil 10. Armature 19 is normally biased away from core legs 12 and 14 by means of spring 68, which has one end connected to the control yoke 17 and the other end connected to an ear comprising a short extension of the top horizontal surface of L-shaped pole piece 15. Control yoke 17 contains an integral finger 18, which extends outwardly therefrom and engages the upper-most first rectangular opening in actuating card 40 to control the vertical movement thereof.

Figure 2:
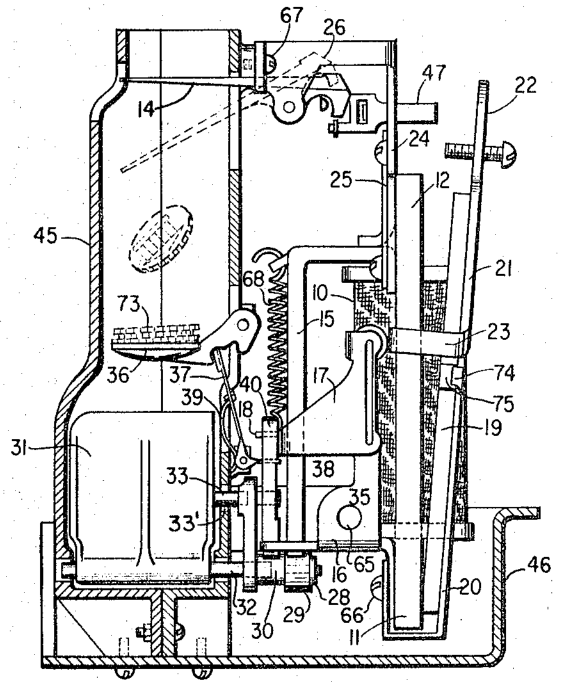
FIG. 2 is a partial cross-sectional side view of the mechanism with the operating elements in normal position.

As shown in particular in FIG. 1, vane control link 30, which is composed of an insulating type material, is substantially L-shaped. Permanent magnet 29 is mounted on shaft 69 as shown, with a projection on link 30 engaging a notch in the permanent magnet. Permanent magnet 29 is locked in the assembled position by the internal-toothed clip-on washer 28 to provide a unitary structure. As shown in FIG. 2, vane control link 30 is operatively coupled to coin deflector vane 31 by being mounted on shaft 32 with link coupling arm 33 engaged in opening 34. It is pointed out that coupling arm 33 extends through an arcuate shaped slotted opening 33′ (not shown in detail) in the side of coin chute 45.

As shown in FIGS. 1, 3, 4, and 5, actuating card 40 is also composed of an insulating type material and is shown as flat and substantially arrowhead-shaped in appearance. A first small rectangular opening is formed in the upper portion of actuating card 40 for engagement by finger 18 of control yoke 17. Directly below the first opening in card 40 is a second small rectangular opening for engagement by operating finger 38 of coin trap control lever 37. A relatively large U-shaped opening, substantially in the center of card 40 and directly below the second rectangular opening, is provided for operative engagement with control link operating finger 35. Center portion 44 of the U-shaped opening is shaped to slope from its center in both directions towards legs 42 and 43 to provide a means for guiding operating finger 35 thereto during operation of card 40. A small indentation 41 is formed in the bottom of the U-shaped opening to provide a normal inoperated position for finger 35.

When the coin chute portion comprising mainly chute 45, coin trap 36, control lever 37, deflector vane 31, control link 30 and permanent magnet 29 is assembled with the electromagnet portion comprising mainly coil 10, core 11, pole piece 15, armature 19, control plate 21, control yoke 17, bracket 16 and actuating card 40 as shown in FIG. 2, it will be seen that finger 38 of control lever 36 is engaged with the second rectangular opening of card 40; that operating finger 35 of link 30 is positioned within the U-shaped opening of card 40; and that the extreme lower end of pole piece 15 is located directly above permanent magnet 29.

Figure 5:
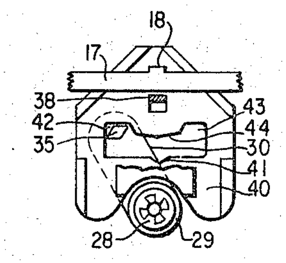
FIG. 5 is a view similar to FIG. 4, but showing the actuating card and vane control link in the collect position.
Figure 6:
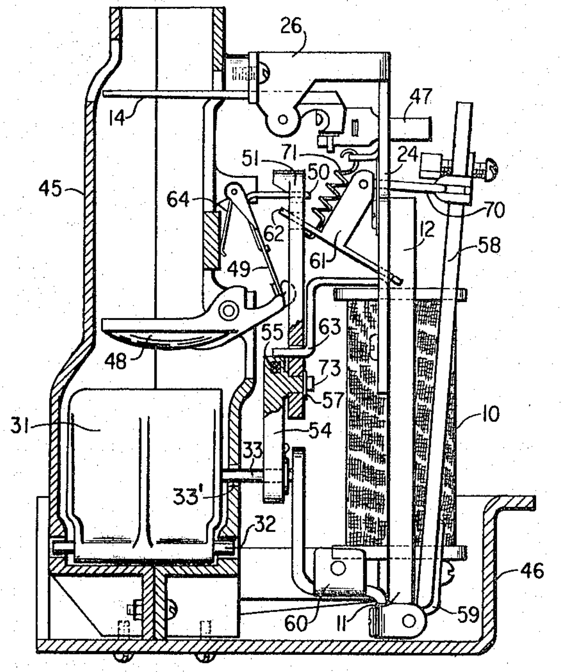
FIG. 6 shows a modification of the coin disposal apparatus of FIGS. 1 through 5 and is a partial cross-sectional side view thereof with the operating elements in normal position.
Figure 7:
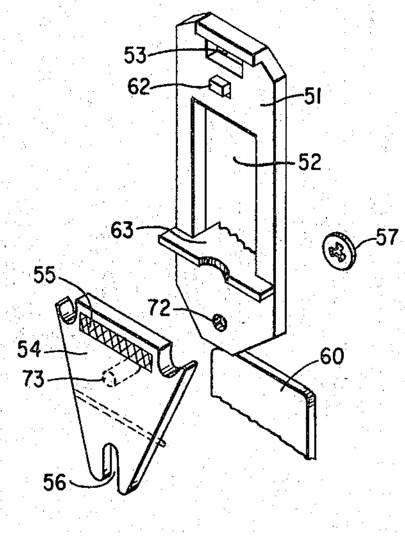
FIG. 7 shows a slightly enlarged view of the actuating card and vane control link of the modified coin disposal apparatus shown in FIG. 6.

Referring to the modified coin collector apparatus as shown in FIGS. 6 and 7, it will be appreciated that electromagnet coil 10 is supported on the E-shaped core 11 in the same manner as described for the apparatus shown in FIGS. 1 through 5. A bracket 60 is secured to the lower edge of core 11 to provide a means for holding vane control link 54 in position; to provide a means for securing coin chute 45 by a lower pair of arms (not shown) to mounting holes therein; and to provide a hinged mounting for armature 58 by means of hinge element 59.

Armature 58 is mounted on the outer surface of core legs 12 and 14, and is operatively connected by means of linkage 70 to card control yoke 61. Armature 58 is normally biased away from core legs 12 and 14 by means of the biasing action of spring 71 on control yoke 61. Control yoke 61 contains an integral finger 62, which extends outwardly therefrom and engages the second rectangular opening (FIG. 7) in actuating card 51 to control the vertical movement thereof.

Vane control link 54, which is composed of an insulating type material, is substantially arrowhead-shaped and contains permanent magnet 55 embedded therein extending along the upper edge as shown in FIG. 7. Control link 54 is pivotally mounted to actuating card 51 at hole 72 by means of shaft 73 and clip-on washer 57. Notch 56 is provided in link 54 for engaging link coupling arm 33 of coin deflector vane 31 to pivotally control the operation thereof.

Actuating card 51 is also composed of an insulating type material, being flat and substantially rectangular in appearance. At the upper end of card 51 is a first rectangular opening 53 for engaging operating finger 50 of coin trap control lever 49, while directly below opening 53 is a second rectangular opening for engaging finger 62 of control yoke 61. A large rectangular third opening 52 is centrally located in card 51 and is adapted to accommodate pole piece 63, whereby pole piece 63 functions (1) as an extension from the core leg 13 of core 11 to influence permanent magnet 55, when electromagnet coil 10 is energized for tilting control link 54 one direction or the other in accordance with the direction of current flow through coil 10, to establish a secondary magnetic current circuit and thus control the direction of operation of deflector vane 31; and (2) to serve as a guide for actuating card 51 when it is moved in a vertical direction as a result of the operation of armature 58 when coil 10 is fully energized.

Referring to FIG. 6, it will be seen that the coin chute portion and electromagnet portion are assembled into a complete unit in a manner similar to that previously described for the preferred embodiment.

Figure 3:
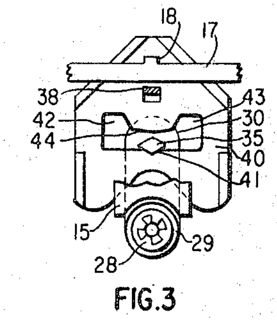
FIG. 3 is a fragmentary view from the rear, or coin magnet side, showing the actuating card and the vane control link in the normal position.
Figure 4:
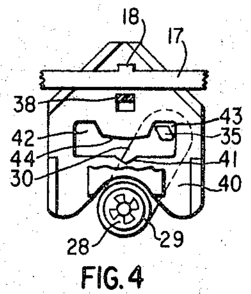
FIG. 4 is a view similar to FIG. 3, but showing the actuating card and vane control link in the refund position.

An operational description of the preferred embodiment will now be given, reference being had with FIGS. 1–5, inclusive. It will be assumed that the mechanism is in the normal inoperated position as shown in FIG. 2, with vane control link 30 and actuating card 40 being in their normal positions such as shown in FIG. 3. It will further be assumed that the coin disposal apparatus is used in a telephone pay station of a type similar to that disclosed in the aforementioned Forsberg patent; that a telephone call has been initiated from the pay station; that the required number of coins have been deposited as the payment for the call; and that these coins are resting on top of coin trap 36. It will further be assumed that current corresponding to coin collect potential has been applied to the telephone connection from the central office in a well-known manner and that this potential is extended to electromagnet coil 10. It will be noted that control yoke 17 and bracket 16 are constructed of a non-magnetic material, whereby the magnetic field established from the lower tip of pole piece 15 to the bottom portion of core 11 is intensified, thus establishing a relatively strong magnetic pole at the lower end of pole piece 15 in response to the initial energizing of electromagnet coil 10. Permanent magnet 29 reacts to the magnetic field set up by pole piece 15, and the polarity thereof, in such a manner as to initially preposition vane control link 30 a slight amount in the counter-clockwise direction when viewing FIG. 3. This prepositioning of vane control link 30 by permanent magnet 29 is such that link operating finger 35 is moved to the left-hand sloped section of center portion 44 of actuating card 40. As electromagnet coil 10 becomes completely energized, the top of armature 19 and its associated control plate 21 is attracted toward core legs 12, 13 and 14 and in so doing rotates control yoke 17 in a counter-clockwise direction by means of extension fingers 23. As control yoke 17 is rotated, finger 18, which engages the first rectangular opening of actuating card 40, moves card 40 downward and at the same time, the left-hand sloped section of center portion 44 pushes link operating finger 35 further to the left into the left leg 42 as shown in FIG. 5, whereby vane control link 30 also rotates coin deflector vane 31 in the same direction. At the time that coin deflector vane 31 is moved to its extreme left position, actuating card 40 is approaching the maximum downward movement, at which time lever operating finger 38, which is engaged with the second rectangular opening in card 40, rotates coin trap control lever 37 in a clockwise direction when viewing FIG. 2, to unlock coin trap 36 from its locked position. In response to being unlocked, coin trap 36 drops downward to allow the coin deposit to fall and be guided by means of coin deflector vane 31 into the coin collect box (not shown). At this point in the operation, the central office removes the collect potential from the connection, and electromagnet coil 10 is de-energized, whereby the biasing action of spring 68 against control yoke 17 returns armature 19, coin trap 36, vane control link 30, coin deflector vane 31, and actuating card 40 to their normal positions.

In operating the mechanism to refund a coin deposit, the polarity of the current of the coin control potential applied to the telephone connection from the central office is reversed, whereby the resultant effect of energized electromagnet coil 10 is to reverse the polarity of pole piece 15. Permanent magnet 29 is thereby effected in the opposite direction to preposition vane control link 30 and coin deflector vane 31 to the right as viewed in FIG. 4 whereby finger 35 of control link 30 is prepositioned on the right hand sloped section of center portion 44. The remaining operations of the mechanism are similar to that described for the collect operation with the exception that when electromagnet coil 10 is completely energized, finger 35 is positioned in leg 43 of actuating card 40, and vane 31 is moved to the refund position. As the coin deposit is released from resting on coin trap 36, the coins are directed into the refund channel by coin deflector vane 31.

Reference will be had with FIGS. 6 and 7 for a descriptional operation of the modified coin disposal apparatus shown therein. It will be assumed that the mechanism of the apparatus is in the normal inoperated position as shown in FIG. 6. It will further be assumed that the coin disposal apparatus is used in a telephone paystation of the type similar to that disclosed in the aforementioned Forsberg patent; that a telephone call has been initiated from the paystation; that the required coin deposit has been made as payment for the call; and that these coins are resting on top of coin trap 48. It will further be assumed that current corresponding to coin collect potential has been applied to the telephone connection by the central office in a well-known manner and that the potential is extended to electromagnet coil 10. It will be noted that lower bracket 60 is constructed of a magnetizable material, whereby the magnetic field established from the lower end of pole piece 63 to bracket 60 is intensified, thus establishing a relatively strong magnetic pole at the lower end of pole piece 63 in response to the initial energizing of electromagnetic coil 10. Since permanent magnet 55 is located directly below the lower end of pole piece 63, permanent magnet 55 reacts to the polarity of the magnetic field set up thereby in such a manner as to initially preposition vane control link 54 a slight amount in the counterclockwise direction when viewing FIG. 7. Since vane control link 54 is rotated at shaft 73 and since slot 56 is engaged with coupling arm 33 of vane 31, vane 31 will also be slightly prepositioned in the collect direction for a complete subsequent movement to guide the deposited coins for collection. As electromagnet coil 10 becomes completely energized, the top of armature 58 is attracted toward coil legs 12, 13 and 14, and in so doing rotates control yoke 61 in a counterclockwise direction by means of linkage 70. As control yoke 61 is rotated, finger 62, which engages the second rectangular opening of actuating card 51, moves card 51 downward to cause the prepositioned vane control link 54 to rotate further in the counterclockwise direction, thereby moving coin deflector vane 31 to the maximum, or collect, position. At the same time that coin deflector vane 31 is moved to the full collect position, actuating card 51 is approaching the maximum downward movement, at which time lever operating finger 50, which is engaged in the first rectangular opening 53 in card 51, rotates coin trap control lever 49 in a clockwise direction to unlock coin trap 48 from its locked position. In response to being unlocked, coin trap 48 drops downward to allow the coin deposit to fall and be guided by means of coin deflector vane 31 into the coin collect box (not shown). At this point in the operation, the central office removes the collect potential from the connection to deenergize electromagnet coil 10, whereby the biasing action of spring 71 returns armature 58, coin trap 48, vane control link 54, coin deflector vane 31 and actuating card 51 to their normal positions.

In operating the mechanism to refund a coin deposit, the polarity of the current of the coin control potential applied to the telephone connection from the central office is reversed, whereby the resultant effect of the magnetic field established by the initially energized electromagnet coil 10 is to reverse the polarity of pole piece 63. Permanent magnet 55 is thereby effected by the reverse polarity to cause the prepositioning of vane control link 54 and coin deflector vane 31 in a clockwise direction as viewed from FIG. 7, whereby the subsequent operation of link 54, in response to the complete energization of coil 10, will move coin deflector vane 31 to the full refund position. The remaining operations of the mechanism are similar to that described for the collect operation with the exception that the deposited coins are refunded by means of coin deflector vane 31. As the coin deposit is released in response to the unlocking of coin trap 48, the coins are directed into the refund channel for return to the paystation user.

Figure 8:
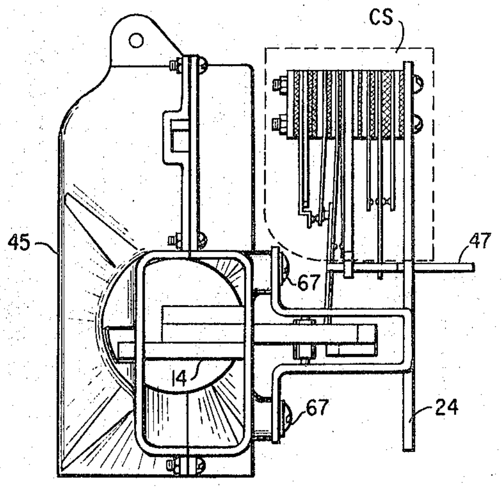
FIG. 8 is a top view of FIG. 2, showing the coin springs in detail, which are represented in dotted box form in FIG. 1.

Since the contact springs represented within the dotted box portion as CS in FIG. 8 perform no specific function with respect to the operation of the coin disposal mechanism, their operations will not be described herein.

Having described my invention, what is considered new and is desired to have protected by Letters Patent will be pointed out in the appended claims.

What is claimed is:

1. In a coin disposal mechanism adapted for use with a telephone paystation; a coin chute having a coin deflector vane pivotally mounted therein by means of a shaft and having one end thereof extending through the side wall of said chute at the pivot point; a coupling arm integral with said deflector vane and extending through an arcuate slotted opening in said chute; a deflector vane control link mounted external of said chute on said one end of said shaft and operatively connected to said coupling arm; an electromagnet; a pole piece having an end portion extending from the core of said electromagnet; a permanent magnet mounted on said vane control link, concentric with said one end of said shaft, directly below said end portion of said pole piece and adapted to be influenced by the direction of the current flowing through said electromagnet and the resulting polarity of said pole piece end portion for selectively prepositioning said control link and said deflector vane in an initial direction of movement to the right or to the left to determine the subsequent direction of a complete movement of said deflector vane for the execution of a desired coin disposal operation.

2. In a coin disposal mechanism such as claimed in claim 1, including means operatively controlled by said electromagnet for moving said control link and said coin deflector vane in said complete movement in said prepositioned initial direction of movement.

3. In a coin disposal mechanism adapted for use with telephone paystations; an electromagnet having an armature operably connected therewith; a control bracket arranged for pivotal operation by said armature; a coin chute in said mechanism adjacent to said electromagnet; a coin deflector vane pivotally mounted in said chute by means of a shaft and having one end of said shaft extending through the side wall of said chute at the pivot point; a coupling arm integral with said deflector vane and extending through an arcuate slotted opening in said chute; a deflector vane control link mounted external of said chute on said one end of said shaft and operatively connected to said coupling arm; an actuating card operatively connected to said control bracket and to said vane control link; a pole piece having an end portion extending from the core of said electromagnet; a permanent magnet mounted on said vane control link, concentric with said one end of said shaft, directly below the end portion of said pole piece and adapted to be influenced by the direction of the current flowing through said electromagnet and the resulting polarity of said pole piece end portion for selectively prepositioning said control link and said deflector vane in an initial direction of movement to the right or to the left to determine the subsequent direction of complete movement of said deflector vane, in response to a downward movement of said actuating card under the influence of said control bracket as controlled by said electromagnet and armature; whereby said complete direction of movement of said coin deflector vane disposes of a coin deposit in said chute in a right or left direction, in accordance with the direction of current flow through said electromagnet.

References Cited by the Examiner

UNITED STATES PATENTS

| | | | |
|---|---|---|---|
| 1,043,219 | 11/1942 | Forsberg | 232—57.5 |
| 2,782,984 | 2/1957 | Hoban | 232—57.5 |
| 2,951,635 | 9/1960 | Boysen et al. | 232—57.5 |

References Cited by the Applicant

UNITED STATES PATENTS

| | | |
|---|---|---|
| 2,121,970 | 6/1940 | Landreth. |
| 2,218,609 | 10/1938 | Henning. |

FRANK B. SHERRY, *Primary Examiner.*

R. B. FARLEY, F. K. ZUGEL, *Assistant Examiners.*